Aug. 18, 1964  J. W. I. HEIJNIS  3,144,864
MELTING APPARATUS
Filed May 31, 1962

INVENTOR.
JAMES WATT IJSBRAND HEIJNIS
BY
Francis W. Young
ATTORNEY

3,144,864
MELTING APPARATUS

James W. I. Heijnis, Arnhem, Netherlands, assignor to American Enka Corporation, Enka, N.C., a corporation of Delaware
Filed May 31, 1962, Ser. No. 199,076
Claims priority, application Netherlands June 12, 1961
4 Claims. (Cl. 126—343.5)

This invention relates generally to the melt spinning or extrusion of thermoplastic materials and more particularly to an improved melting chamber and grid for melting thermoplastic granules prior to spinning.

Conventional melting apparatus used in the melt spinning process generally comprises a melting chamber near the bottom of which is positioned a flat melting grid. A hopper underneath the grid collects melted polymer in a pool. One disadvantage of such apparatus is that the pool is relatively large resulting in the subjection of the molten polymer to high temperature for a considerable period, thus causing it to decompose.

It is known that this problem may be minimized by using a funnel-shaped tubular melting grid positioned in a heated funnel-shaped melting chamber, the funnel angle of said melting grid being approximately equal to that of the melting chamber. In this way the contents of the pool are reduced to a minimum. Although such melting aparatus reduces thermal degradation of the polymer, it has certain disadvantages, namely, that partially melted granules gradually pass through the grid. Moreover, gas bubbles develop in the polymer melt and, additionally, the polymer melt is not homogeneously heated in the pool.

It is therefore an object of this invention to provide melting apparatus for use in the melt extrusion of thermoplastic material that does not have the disadvantages inherent in the known melting apparatus.

Another object of this invention is to provide apparatus for melting thermoplastic material which restrains the passage of only partially melted polymer granules through the grid and in which the formation of gas bubbles in the melt is minimized.

Still another object of this invention is to provide apparatus for melting thermoplastic material in which the polymer melt is homogeneously heated.

These and other objects will become apparent from the following detailed description.

In accordance with applicant's invention, granules of polymeric substances may be effectively melted prior to the melt spinning thereof into filaments by using a vertical melting apparatus comprising a funnel-shaped melting chamber and a conical melting grid made of tubing or bar stock arranged in spiral or interconnected consecutive rings. The rings should lie immediately adjacent one another so that viewed from above the grid appears closed. Tubing having a triangular cross-section is used in the construction of the grid with the side nearest the funnel axis being positioned parallel to that axis, and the other two sides of the triangle making an acute angle therewith. At least the lower angle of the triangle is rounded. Both the melting chamber and the melting grid may have funnel angles ranging from 40° to 120°.

Since the melting grid is closed in horizontal projection, i.e., when projected into a horizontal plane, partially melted granules are prevented from passing through the grid and air bubbles are prevented from forming in the polymer melt.

By using tubing of triangular cross-section a larger melting area is obtained in comparison to that provided by round cross-section tubing. Thus, a larger amount of polymer may be melted per unit of time. Furthermore, since the vertical surface of the triangular tubing runs parallel to the axis of the melting funnel, the supply of granules to the melting grid is constant and takes place according to the principle of plug flow.

It is essential to applicant's invention that the melting grid be closed in horizontal projection. Preferably this is accomplished by using grid tubing having a triangular cross-section with the lower angle of the tubing rounded off to allow free flow of the melt. To simplify construction of the melting grid, the other angles may also be rounded off.

The funnel angle of the melting chamber must be between 40° and 120° since it has been found that in this range the melt is discharged and tempered uniformly. The melting grid may have a funnel angle that is subtantially equal to that of the melting chamber. Preferably, however, the funnel of the grid should be somewhat larger than that of the chamber to facilitate the discharge of the melt. The conical melting grid may be spirally coiled, or alternatively, it may be made up of coaxially positioned interconnected rings.

The upper surface of the tube from which the grid is composed slopes down toward the wall of the melting chamber. As a result, the freshly melted polymer flows into the space between the melting funnel and the wall of the melting chamber. The top angle of the triangular cross-sectioned grid tube should be at least 30° and preferably should be approximately 60° to obtain optimum melting capacity and flow.

As aforementioned, the funnel angle of the melting chamber is preferably somewhat smaller than that of the conical melting grid. It has been found that molten polymer is discharged in a very satisfactory manner if the funnel angles of the melting chamber and of the melting grid are 55° and 60°, respectively.

For purposes of further illustration, there is shown in the drawing preferred embodiments of the invention. However, the invention is not intended to be limited to the precise arrangements and instrumentalities shown.

In the figures, the numeral 1 refers to the melting chamber which is connected to a feed device (not shown) for the polymer granules. The polymer melt is discharged by way of a discharge opening 2. A flange 3 serves to connect the melting chamber with a heated spinning pump (not shown) to deliver the melt for spinning. The melting chamber may be heated by means of a liquid, vapor or gas. The heating medium is passed into the jacket 5 surrounding the melting chamber by way of line 4 and discharged through line 6.

Figure 1:
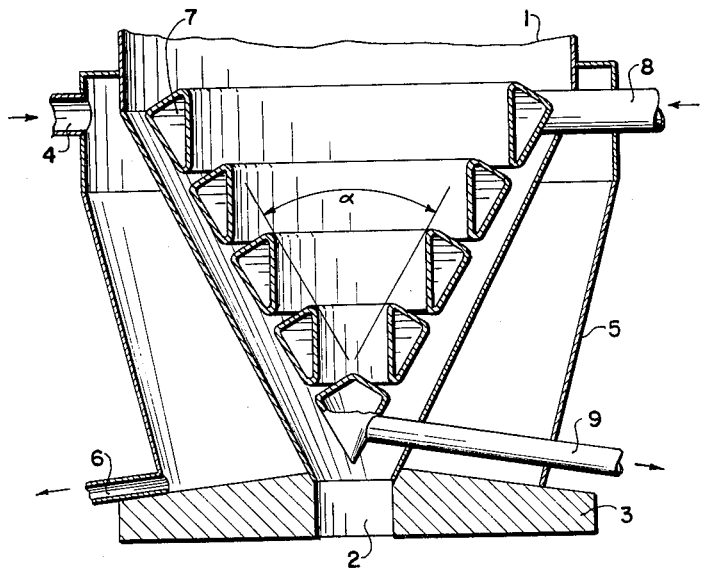
FIGURE 1 is a vertical view partly in section of the apparatus provided with a grid of coaxially positioned interconnected tubular rings.
Figure 2:
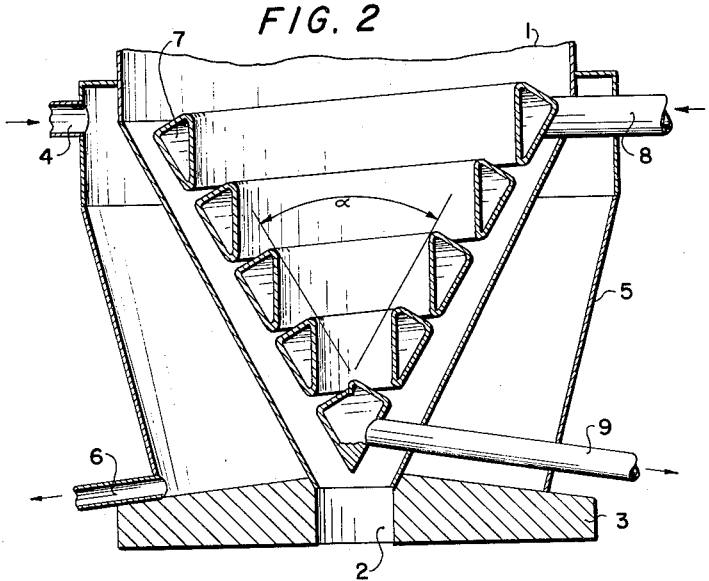
FIGURE 2 is a vertical view partly in section of the apparatus provided with a spirally coiled melting grid.

In the melting chamber there is provided a conical melting grid 7 composed of tubing having a triangular cross-section. The melting grids may also be heated by means of liquid, vapor or gas, which is fed to the grid by way of line 8 and discharged through line 9. In the figures the funnel angle $\alpha$ of the conical melting grids are approximately 60°. In FIGURE 1 a line (not shown) interconnects the rings 7 to provide free flow of the heating medium through the grid.

Melting apparatus constructed in accordance with this invention enables the polymer granules to be thoroughly melted prior to the spinning thereof and thus eliminates the problem of partially melted granules passing through the grid. The formation of gas bubbles in the melt is minimized and, moreover, the melt is homogeneously heated.

It will be apparent to those skilled in the art that many variations and modifications of this invention may be

What is claimed is:

1. Apparatus for melting granules of thermoplastic polymer comprising a funnel-shaped melting chamber and a melting grid disposed within said chamber, said grid consisting of a spirally coiled tube conforming to the shape of an inverted cone and closed in horizontal projection, the cone angle of said grid being approximately equal to the funnel angle of said chamber and between from 40 to 12°, said grid spaced a sufficient distance from the inner wall of said chamber to allow for the free flow of molten polymer between the grid and inner wall of said chamber, the tubing of said grid being triangular in cross section with the side positioned nearest the cone axis running parallel thereto and the other sides making an acute angle therewith, whereby polymer granules supplied to said apparatus are uniformly melted during passage through said grid and unmelted or partially melted granules are prevented from passing through said grid.

2. The apparatus of claim 1 in which the top angle of the triangular cross-sectioned grid tubing is at least 30°.

3. The apparatus of claim 1 in which the funnel angle of the melting chamber is about 55° and the funnel angle of the melting grid is about 60°.

4. Apparatus for melting granules of thermoplastic polymer comprising a funnel-shaped melting chamber and a melting grid disposed within said chamber, said grid consisting of coaxially interconnected tubular rings conforming to the shape of an inverted cone and closed in horizontal projection, the cone angle of said grid being approximately equal to the funnel angle of said chamber and between from 40 to 12°, said grid spaced a sufficient distance from the inned wall of said chamber to allow for the free flow of molten polymer between the grid and inner wall of said chamber, the tubing of said grid being triangular in cross section with the side positioned nearest the cone axis running parallel thereto and the other sides making an acute angle therewith, whereby polymer granules supplied to said apparatus are uniformly melted during passage through said grid and unmelted or partially melted granules are prevented from passing through said grid.

References Cited in the file of this patent

UNITED STATES PATENTS

| | | |
|---|---|---|
| 877,544 | Beuhne | Jan. 28, 1908 |
| 942,337 | Moore | Dec. 7, 1909 |
| 1,598,508 | Saunders | Aug. 31, 1926 |
| 2,360,665 | Fields | Oct. 17, 1944 |
| 2,916,262 | Flores | Dec. 8, 1959 |

FOREIGN PATENTS

| | | |
|---|---|---|
| 755,158 | Great Britain | Aug. 15, 1956 |